United States Patent [19]

Te Velde

[11] Patent Number: 4,999,619
[45] Date of Patent: Mar. 12, 1991

[54] ELECTRO-OPTIC DISPLAY DEVICE FOR USE IN THE REFLECTION MODE

[75] Inventor: Ties S. Te Velde, Waalre, Netherlands

[73] Assignee: U.S. Philips Corporation, New York, N.Y.

[21] Appl. No.: 204,145

[22] Filed: Jun. 8, 1988

[30] Foreign Application Priority Data

Jun. 10, 1987 [NL] Netherlands ............... 8701347
May 4, 1988 [NL] Netherlands ............... 8801164

[51] Int. Cl.[5] .............................................. G09G 3/36
[52] U.S. Cl. .................................... 340/784; 340/785; 350/333
[58] Field of Search ............... 340/784, 805, 719, 765, 340/785, 786, 787, 788; 350/333, 334

[56] References Cited

U.S. PATENT DOCUMENTS

| 4,378,955 | 4/1983 | Bleha, Jr. et al. | 350/334 |
| 4,426,133 | 1/1984 | Funada et al. | 350/334 |
| 4,544,583 | 10/1985 | Claussen et al. | 350/334 |
| 4,652,088 | 3/1987 | Kando et al. | 350/334 |
| 4,682,858 | 7/1987 | Kanbe et al. | 350/334 |
| 4,697,884 | 10/1987 | Amstutz et al. | 350/334 |
| 4,707,079 | 11/1987 | Inoue | 350/334 |
| 4,767,190 | 8/1988 | Dir et al. | 350/334 |
| 4,815,825 | 3/1989 | Nakagomi et al. | 350/334 |

Primary Examiner—Alvin E. Oberley
Assistant Examiner—M. Fatahiyar
Attorney, Agent, or Firm—John C. Fox

[57] ABSTRACT

Liquid crystal display device (1) based on dielectric anisotropy in such thin layers that the effective optical path length difference between the two optical states is $\frac{1}{2}\lambda_0$ after reflection. A semiconductor body provided with drive elements (12) which is completely coated with a reflective layer (24) is used as a reflective substrate (6).

25 Claims, 3 Drawing Sheets

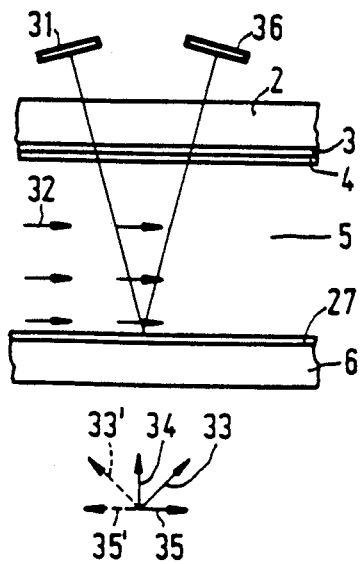
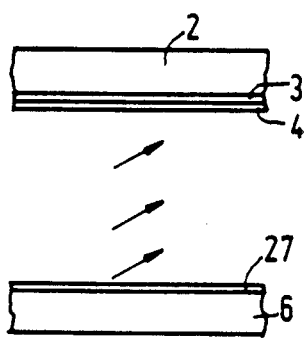
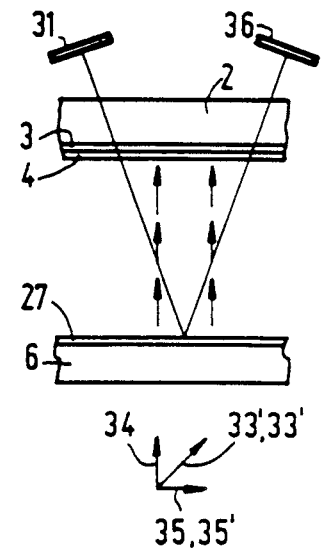
FIG. 3a  FIG. 3b  FIG. 3c
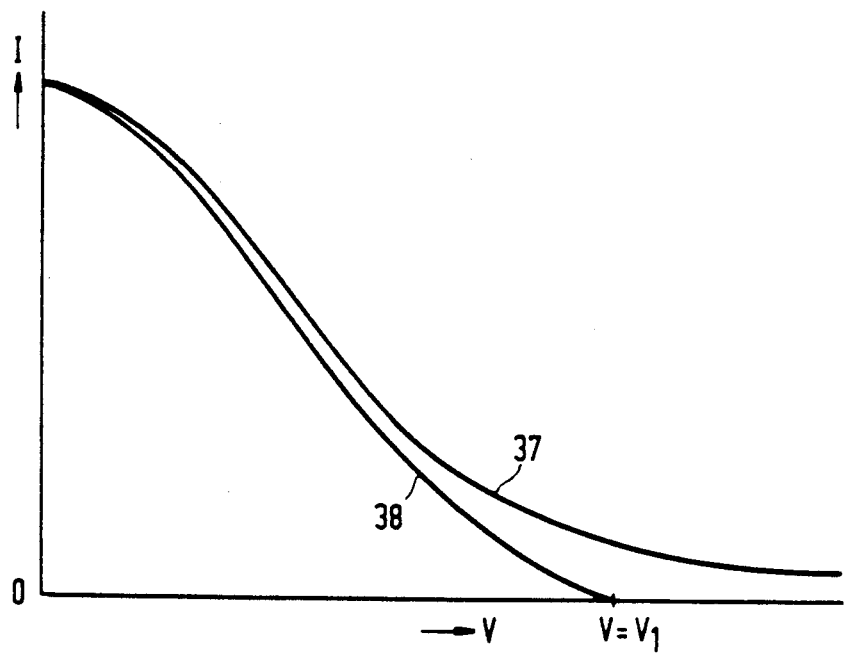
FIG. 4

ELECTRO-OPTIC DISPLAY DEVICE FOR USE IN THE REFLECTION MODE

BACKGROUND OF THE INVENTION

The invention relates to an electro-optic display device for use in the reflection mode, comprising a layer of liquid crystalline material between a first transparent supporting plate having at least one transparent first control electrode and a second supporting plate spaced by means of spacers and comprising at least one semiconductor body having one or more switching elements for driving a picture element matrix arranged in rows and columns and having picture electrodes which can be electrically driven separately, said picture electrodes substantially completely covering the semiconductor body at least at the area of the switching elements.

A display device of the type described in the opening paragraph is known from U.S. Pat. No. 4,239,346. The electro-optic effect used in this device (dynamic scattering) is slow.

OBJECTS AND SUMMARY OF THE INVENTION

It is an object of the invention to provide a display device of the type described in the opening paragraph, which has a sufficiently high density of picture elements and is fast enough to display rapidly varying pictures.

It is another object of the invention to provide a display device in which grey scales can be obtained in a reproducible manner.

To this end a display device according to the invention is characterized in that the layer of liquid crystalline material is switchable between two states of transmission via electric voltages on the picture electrodes, said device, dependent on the applied electric voltage, traversing a range of continuously decreasing or increasing values of transmission between a first state of maximum transmission in which the molecules of the liquid crystal material have a first direction of orientation and a second state of minimum transmission in which the molecules of the liquid crystal have a second direction of orientation substantially perpendicular to the first direction of orientation, the difference in the effective optical path length between the two states after reflection being substantially $\frac{1}{2} \lambda_0$ for an incident light beam having a central wavelength $\lambda_0$.

The invention is based on the recognition that the effective path length difference should be limited to substantially $\frac{1}{2} \lambda_0$ for the purpose of a satisfactory operation. This implies that the thickness of the layer of liquid crystal material must decrease, with the result that the switching times may decrease to several milliseconds.

When using materials having a negative dielectric anisotropy, the molecules of the liquid crystal in the voltageless state have a direction of orientation which is substantially perpendicular to the supporting plates. Substantially perpendicularly incident light is then not subjected to birefringence and, dependent on the polarization directions of the polarizer and analyzer i.e., parallel or crossed, it is passed or not passed after reflection.

Birefringence, occurs from a given threshold voltage. As the voltage increases, the birefringence rapidly increases to a value at which the effective optical path length difference after reflection is $\frac{1}{2} \lambda_0$. The adjustment of this value is very critical in the devices conventionally used because the layer thicknesses used are too large; combined with the rapid increase of birefringence, this renders the adjustment of intermediate states (grey scales) very difficult.

A preferred embodiment of a device according to the invention is therefore characterized in that the molecules of the liquid crystal material in the voltageless state have a direction of orientation which is substantially parallel to the supporting plates or extends at a small angle to the plane of the supporting plates. This provides the possibility of satisfactorily adjusting grey scales.

To this end, the supporting plates are preferably provided with orientation layers giving the molecules a direction of orientation substantially parallel to the plane of the supporting plates or a plane extending at a certain angle thereto (tilt), preferably 15° at most, and the direction of polarization of the polarizer is set at an angle (of preferably 45°) to the direction of orientation of the molecules at the area of the first supporting plate.

In such a device using a liquid crystal material having a positive dielectric anisotropy, grey scales can be obtained in a reproducible manner. At zero voltage the birefringence is maximal so that it holds that $2 \, d\Delta n = \frac{1}{2} \lambda_0$, in which $\Delta n$ is the difference in refractive indices for the ordinary and extraordinary waves and d is the thickness of the liquid crystal layer. A maximum reflection is now achieved between the crossed polarizer and analyzer. In the case of an increasing voltage the molecules are now directed in the direction of the axis perpendicular to the supporting plates. A fairly smooth voltage/transmission characteristic is then obtained.

In order to achieve a state in this device such that the reflection is zero, a relatively high voltage must be applied (theoretically infinitely high) to enable all molecules to be oriented perpendicularly to the supporting plates.

To avoid this, a phase plate having an opposed birefringence is preferably provided, for example, with a phase rotation through an angle $-\delta$. The thickness of the liquid crystal layer is then chosen to be such that for a given $\lambda$ it holds that $2 \, d.\Delta n = \frac{1}{2} \lambda_0 + 2 \, \delta$. At zero voltage the maximal transmission occurs, while extinction is achieved at such an angle between the axis perpendicular to the supporting plates and the liquid crystal molecules that the birefringence produces a phase rotation through $\delta$. This is achieved at much lower voltages. In practice all grey scales were traversed in a voltage range between 0.5 Volt and 2.5 Volt across the liquid crystal material.

Usually a maximal thickness d is chosen for this purpose, for which it holds that $$d \leq \frac{1.2 \, \lambda_0}{4 \Delta n}$$

if $\lambda_0$ is the wavelength used. At a wavelength range up to approximately 800 nanometers, and values of $\Delta n \approx 0.15$ this means that the thickness of the liquid crystal layer is at most 2 $\mu$m.

The orientation of the liquid crystal molecules on the two supporting plates may have a mutual twist. This may favourably influence the switching speed of the device.

The desired uniformity in the thickness of the layer of liquid crystal material may be obtained, for example by the method described in copending patent application Ser. No. 204,144 (PHN 12 145). A preferred embodiment which can more easily be manufactured is characterized in that a supporting plate is provided with spacers obtained by etching from a uniform layer and in that the two supporting plates are held together by pressure means. In order to obtain a uniformly distributed pressure, for example silicone rubber is used as an intermediate material.

To increase the reflective power, the second supporting plate is preferably provided with an additional reflective layer (dielectric mirror) which covers the picture elements and (possible) intermediate parts of the semiconductor material. The intermediate semiconductor material is then still better shielded from incident light.

The second supporting plate may be a glass plate or quartz plate comprising semiconductor elements (for example, TFT switches of amorhpous silicon or polycrystalline silicon) at the area of the picture elements, which plate is subjected to a planarisation treatment, for example before the dielectric mirror and (possible) spacers are provided. Preferably, however, one semiconductor substrate having drive circuits is chosen for this purpose. With the drive circuits and drive lines, an extra layer (or pattern) of conducting material may be provided therein to prevent crosstalk from rows and columns to the picture electrodes. Furthermore, this semiconductor substrate may be provided with a layer of thermally conducting material (for example a metal layer) for cooling the substrate. The latter may alternatively be effected by means of, for example, a separate metal plate between the semiconductor substrate and the silicone rubber.

As has been stated, the display device described is particularly suitable for the purpose of (colour) projection television.

BRIEF DESCRIPTION OF THE DRAWING

The invention will now be described in greater detail by way of example with reference to the accompanying drawings in which:

FIGS. 3a through 3c show diagrammatically a liquid crystal effect based on positive dielectric anisotropy, FIG. 4 shows the associated voltage/light intensity characteristic.

DESCRIPTION OF THE PREFERRED EMBODIMENT

Figure 1:
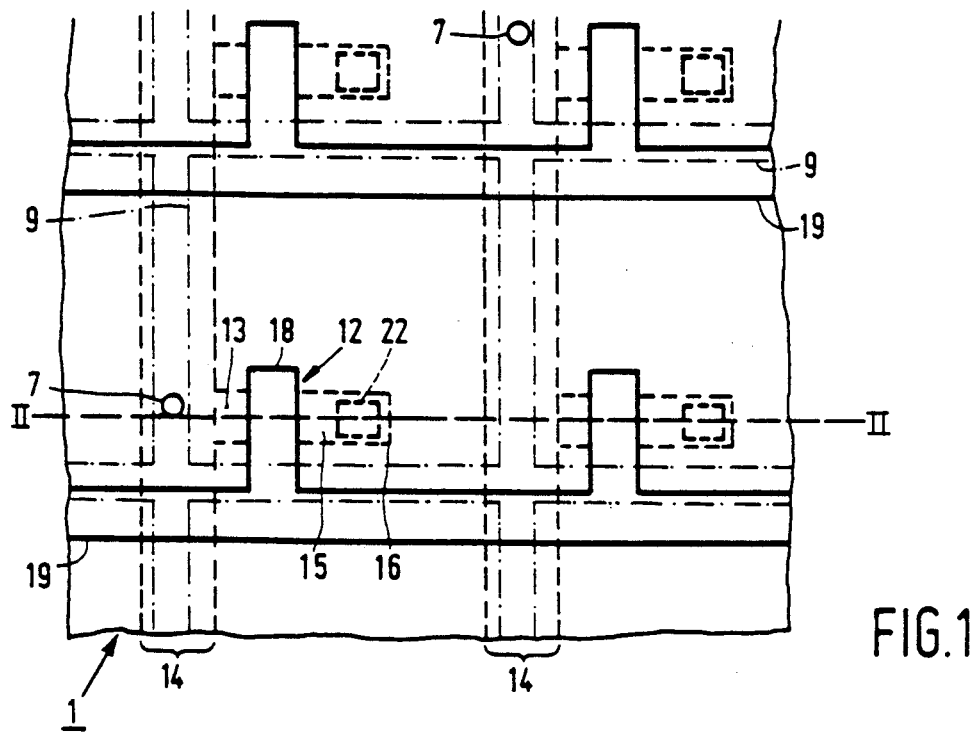
FIG. 1 is a diagrammatic plan view of a part of one of the supporting plates.
Figure 2:
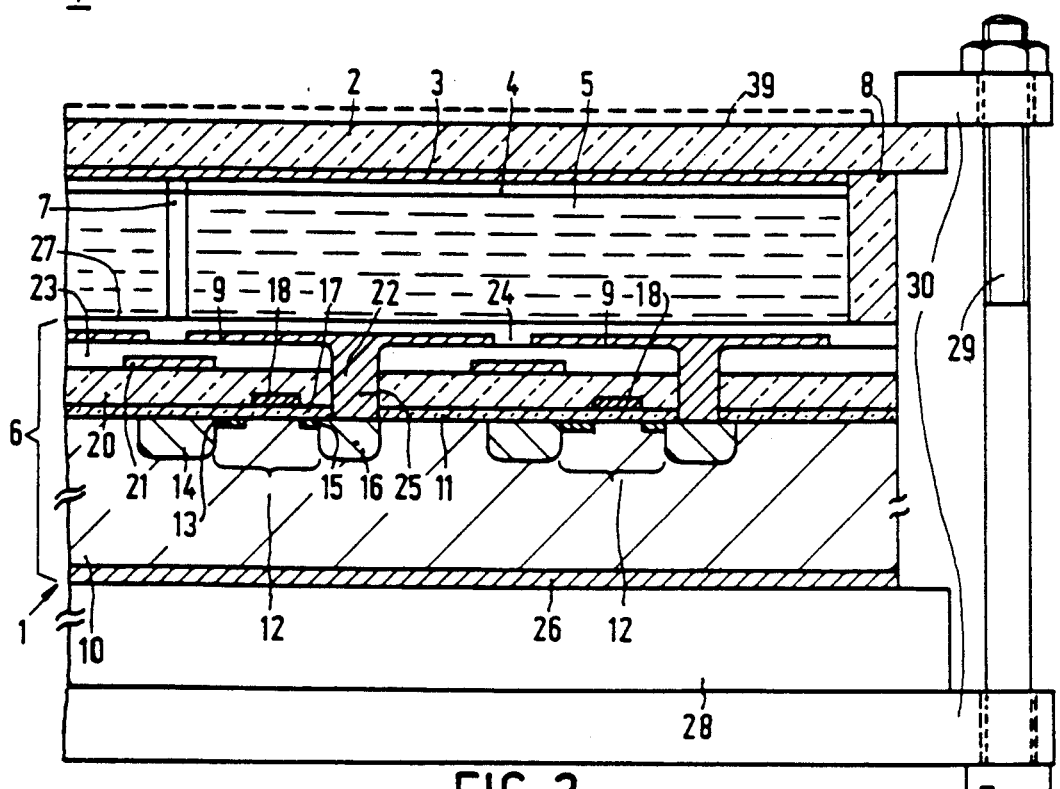
FIG. 2 is a diagrammatic cross-section taken on the line II—II in FIG. 1.

FIG. 1 is a diagrammatic plan view and FIG. 2 is a diagrammatic cross-section of a display device 1 comprising a first supporting plate 2 of, for example, glass. The supporting plate 2 has a transparent electrode 3 of indium tin oxide or another suitable material and, if necessary, an orientation layer 4 which may also serve to prevent unwanted reactions between the liquid crystal material 5 and the electrodes. The liquid crystal material 5, for example, ZLI 1132 (Merck) is present between the first supporting plate and a second supporting plate which is constituted by a semiconductor body 6; the supporting plates are spaced by spacers 7. The assembly is enclosed by a rim 8.

In this embodiment a matrix of picture elements comprising reflective picture electrodes 9 of, for example, aluminium is arranged on the second supporting plate (the semiconductor body). These picture electrodes may be electrically driven by means of switching elements realised in the semiconductor body 6. This semiconductor body, which consists of, for example, a p-type substrate 10, comprises n-MOS transistors 12 on a main surface 11, the n-type source zones 13 of these transistors being connected to $n^+$-type zones 14 which are common for the picture elements in one column and thus function as column conductors. The n-type drain zones 15 of the MOS transistors 12 are connected to $n^+$-type contact zones for contating the picture electrodes 9.

The main surface 11 is coated with a layer of insulating material 17, for example, silicon oxide which functions as a gate oxide at the area of gate electrodes 18. The source zone 13 and the drain zone 15 are arranged in a self-registering manner with respect to the gate electrode by means of shallow ion implantation. The gate electrodes 18 of a plurality of picture elements in a row constitute components of a row electrode 19. Each of the transistors 12 and the associated picture electrode 9 can be separately driven via the row electrodes 19 and the column conductors 14. In order to electrically insulate the gate electrodes, a second insulating layer 20 is provided. In this embodiment a conductor pattern 21 extending above the $n^+$-type layers 14 and the row electrodes 19 is provided on this layer 20. By providing this conductor pattern with a fixed voltage (for example, ground potential) crosstalk from the column and row conductors to the picture electrodes 9 is prevented. The conductor pattern 21 may of course also extend above the switching elements and other parts of the semiconductor body; of course they will then comprise recesses at the area of contact holes 22 in the insulating layers 17, 20 and 23, the latter layer 23 insulating the conductor pattern 21 from the picture electrodes 9. In order to obtain a smooth mirror surface, this insulating layer 23 may be planarised before providing the contact holes 22 and the contact metallisation 25 for the purpose of the electrical connection between the contact zones 16 and the picture electrodes 9. To increase the reflective power, the entire surface may be coated with a dielectric mirror 24. For a satisfactory cooling the lower side of the semiconductor body 6 has a conducting layer 26.

The semiconductor body may extend to beyond the rim 8, for example, when control electronics such as shift registers etc. are located in the peripheral regions of this semiconductor body.

In this embodiment the picture electrodes have a surface area of approximately $30 \times 30$ ($\mu$m)$^2$ while the actual transistors 12 have a surface area of, for example approximately $12 \times 15$ ($\mu$m)$^2$. For the purpose of redundancy a plurality of transistors (or other switching elements) may be realized under a picture electrode 9.

The device of FIGS. 1 and 2 also comprises a plurality of spacers 7. They are obtained by coating the surface 27 of the finished semiconductor body 6 with a layer of magnesium oxide having a thickness of, for example, 0.8 $\mu$m after completing the dielectric mirror 24. This thickness is dependent, inter alia, on the liquid crystal material to be used. The spacers are obtained by means of selective photolithographic etching of the magnesium oxide layer. The quantity of spacers may vary between 1 and 2 per picture element and 1 per 10 to 20 picture elements, dependent on the surface variations in the ultimate surface of the second supporting plate. Prior to providing the layer of magnesium oxide, this surface is subjected to a liquid crystal orienting treatment, such as rubbing. The relevant etching step may also be used for simultaneously defining the rim 8.

The layer 5 of liquid crystal material is determined by the thickness of the layer from which the spacers are etched. In this embodiment it is 0.8 μm. However, in the planar liquid crystal effect based on positive dielectric anisotropy to be used in this embodiment, this layer may vary between, for example, 0.25 μm and 2 μm. To obtain the required uniform thickness of the liquid crystal layer 5, the semiconductor body 6 is pressed against the first supporting plate 2 after the liquid crystal material has been introduced therebetween in advance. In the case of a sufficient pressure a practically uniform thickness of the liquid crystal layer 5 is obtained by means of the spacers 7, despite possible unevennesses on a macroscopic level in the surface 27.

In this embodiment pressing is effected by means of a silicone rubber 28, the total combination including the diagrammatically shown enclosure 30 being held together, for example, by one or more screw connections 29 and thus being subjected to a uniform pressure.

The use of the said planar liquid crystal effect with a positive dielectric anisotropy will now be explained in greater detail with reference to FIGS. 3 and 4. The surface layers 4 and 27 are prepared in such a manner that in the voltageless state the liquid crystal molecules are directed in a given direction parallel to the surfaces of the supporting plates 2, 6 (FIG. 3a).

Linearly polarized light having, for example, a direction of polarization 33 (FIG. 3a) is passed by means of a polariser 31 whose direction of polarization extends at an angle of 45° to the orientation layer of the liquid crystal molecules (shown diagrammatically by the director 32). Since this direction of oscillation extends at an angle of 45° to the direction of orientation of the liquid crystal, the incident polarised wave is split up into an ordinary wave (with a direction of oscillation 34 parallel to the direction of orientation of the liquid crystal) and an extraordinary wave (with a direction of oscillation 35 perpendicular to the direction of oscillation 34).

The difference in optical path length for the ordinary and extraordinary waves is $2\,d\Delta n$ (d=thickness liquid crystal layer; $\Delta n$ difference in refractive indices of the ordinary and the extraordinary wave) upon leaving the liquid crystal after reflection. This difference in optical path length is maximum in the situation of FIG. 3a because the liquid crystal molecules are oriented substantially parallel to the supporting plates ($\Delta n = \Delta n_{max}$). With such a choice of the thickness d that it holds that $2\,d\Delta n_{max} = \frac{1}{2}\lambda_0$ for a chosen wavelength $\lambda_0$, the incoming and outgoing abnormal beams are 180° out of phase with respect to each other (represented by the directions of oscillation 35 and 35′, respectively). The direction of polarisation of the emerging light is then rotated through 90° (represented by 33′ in FIG. 3a) so that this light can pass an analyser 36 whose direction of polarisation 33′ is rotated 90° with respect to that of the polariser 31. At V=0 the maximum quantity of light is reflected.

In the situation of FIG. 3c the directions 32 of the liquid crystal are perpendicular to the two supporting plates. An incident polarised beam is now not split up and retains its direction of polarisation ($2\,d\Delta n = 0$). This beam is not passed by the analyser 36.

In the intermediate situation of FIG. 3b it holds that $0 < 2\,d\Delta n < \frac{1}{2}\lambda_0$. The emerging beam is now elliptically or circularly polarised and is passed to a greater or lesser extent by the analyser 36, dependent on the applied voltage V and the associated angle between the directors and the supporting plates.

For a full extinction in FIG. 3c, i.e. all directors are perpendicular to the supporting plates, a very high voltage (in theory infinitely high) is required (curve 37 in FIG. 4).

In practice such a high voltage can be prevented by choosing an off voltage $V_1$ (FIG. 4) at which a certain quantity of light is still reflected corresponding to a phase rotation $\delta$ of the polarised light. Full extinction (curve 38 in FIG. 4) is obtained by extending the device of FIG. 1 with a phase plate 39 of, for example polaroid, cellophane or another suitable birefringent material producing an opposite phase rotation $-\delta$. To prevent this phase rotation $-\delta$ at zero voltage from giving rise to birefringence, the thickness d of the liquid crystal layer is chosen to be such that $d\Delta n_{max} = \frac{1}{4}\lambda_0 + \delta$. In practice values up to $$d = \frac{1.2\lambda_0}{4\Delta n}$$

are sufficient. By suitable choice of d, dependent on the birefringence of the phase plate 39 and the phase shift $\delta$, it is achieved that the difference in effective optical path length between the two states is $\frac{1}{2}\lambda_0$ after reflection.

The directors 32 may already have a given angle with respect to the supporting plates (tilt) at V=0. Preferably, this angle is at most 15° in this case a thickness d with $$\frac{\lambda_0}{4\Delta n} \leq d \leq \frac{1.2\,\lambda_0}{4\Delta n}$$

can be chosen in which $\Delta n$ is the difference in refractive index for the ordinary and the extraordinary wave (at V=0).

In a reflection cell based on the effect described above all intermediate intensity values (grey tints) were observed, ranging from fully reflective to fully non-reflective in a voltage range of between substantially 0 Volt and approximately 2.5 Volt, while switching times of the order of 5 to 10 milliseconds were realised. These switching times may even be further reduced (to approximately 2 msec) by giving the directions of orientation on the two supporting plates a mutual twist.

Figure 5:
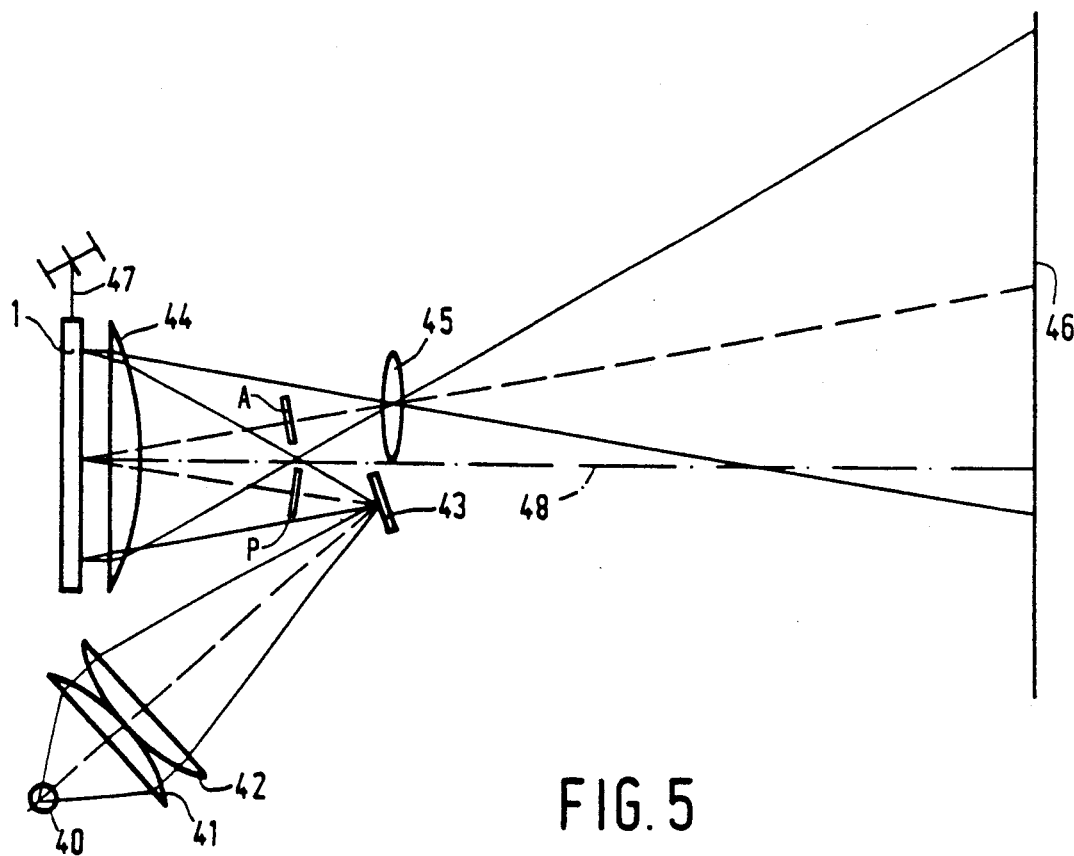
FIG. 5 shows diagrammatically the use of the device of FIGS. 1, 2 in projection television.

FIG. 5 shows diagrammatically a projection device realised by means of an electro-optic device 1 as described with reference to FIGS. 1, 2.

A lamp 40 (shown diagrammatically) emits a light beam which, after having passed collimator lenses 41, 42, impinges upon a mirror 43 and is thereby reflected through a small angle with respect to the normal 48 in the direction of the liquid crystal device 1.

Via a planoconvex lens 44 the light reaches the reflecting electrodes of the semiconductor device, which electrodes determine the state of the liquid crystal under the influence of control electronics. The information may be, for example a TV signal shown diagrammatically by means of the aerial symbol 47.

After reflection the beam leaves the device 1 at a small angle with respect to the normal 48 and reaches the image plane 46 via the planoconvex lens 44 and a second lens 45. This plane may coincide, for example with a projection screen. The polariser P and analyser A are present, for example between the mirror 43 and the planoconvex lens 44 and between the lenses 44 and 45, respectively.

When using the described effect, the spread between the voltage $V_1$ at which extinction occurs for different colours is so small that for monochrome display it is sufficient to use a lamp 40 having a wide spectrum, while a mean value, for example associated with $\lambda = 0.6$ μm is chosen for the thickness d of the liquid crystal layer.

Figure 6:
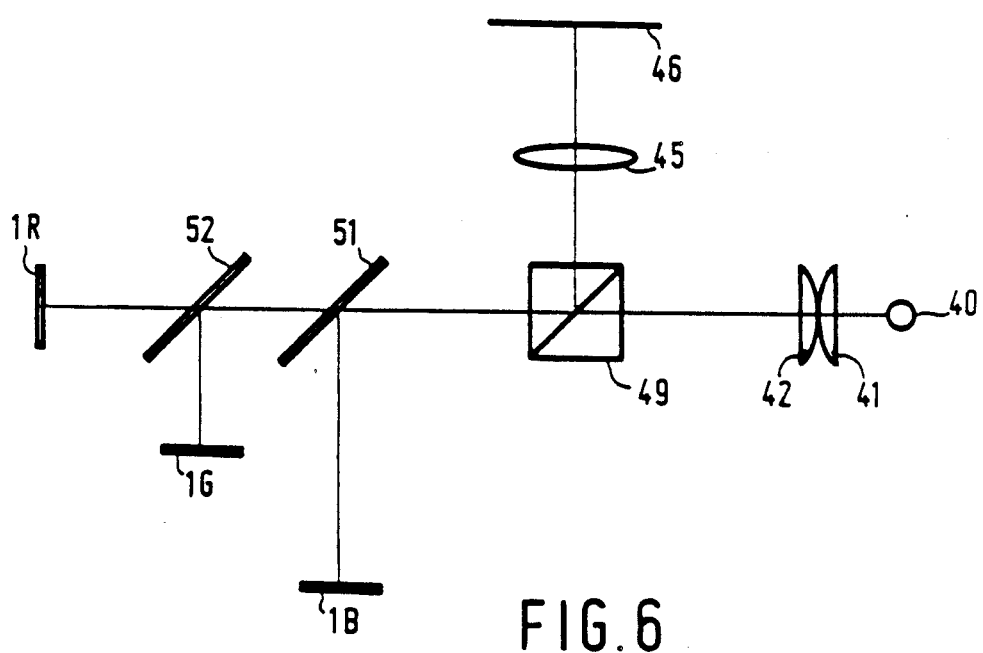
FIG. 6 shows diagrammatically the use of three devices of the invention in a colour projection television.

For colour display FIG. 6 shows the addition of three composite colours, for example blue, green and red. The source 40 then preferably emits a spectrum at a beam having a central wavelength $\lambda i$ (i = 1, 2, 3) while $$\frac{\lambda i}{4\Delta n}$$

is preferably chosen for the thickness d. The beam passes through collimator lenses 41, 42 and beam splitter 49, after which it is split into red, blue and green components by optic elements 51 and 52. Element 51 passes red and green light and reflects blue light onto LCD 1B. Element 52 passes red light and reflects green light onto LCD 1G. Red, blue and green light are separately reflected by LCDs 1R, 1G and 1B, back through elements 52 and 51, and beam splitter 49, to pass through second lens 45 to form a color image at image plane 46.

The invention is of course not limited to the embodiments shown but several variations within the scope of the invention are possible to those skilled in the art. For example, pressing of the second supporting plate may alternatively be performed with other pressure means, while, for example an elastomer or another suitable material instead of silicone rubber can be chosen.

What is claimed is:

1. A display device for use in reflecting an incident beam for display purposes, comprising a layer of liquid crystalline material between a first transparent supporting plate having at least one transparent first control electrode and a second supporting plate spaced by means of spacers from the first supporting plate and comprising at least one semiconductor body having one or more switching elements for driving a picture element matrix arranged in rows and columns and having picture electrodes which can be electrically driven separately, said picture electrodes substantially completely covering the semiconductor body at least at the area of the switching elements, the layer of liquid crystalline material being switchable between two states via electric voltages on the picture electrodes, said device, dependent on the applied electric voltage, traversing a range of continuously decreasing or increasing values of the reflection between a first state in which the molecules of the liquid crystal material have a first direction of orientation and a second state in which the molecules of the liquid crystal have a second direction of orientation substantially perpendicular to the first direction of orientation, characterized in that the difference in the effective optical path length, 2 d$\Delta$n, between the two states after reflection is substantially ½ $\lambda_0$ for an incident light beam having a central wavelength $\lambda_0$, where d is the thickness of the liquid crystal layer and $\Delta$n is the birefringence of the liquid material, while a maximum quantity of light is reflected in one of the two states, whereas a minimum quantity of light is reflected in the other state, and the thickness d is at most 2 μm.

2. A display device as claimed in claim 1, characterized in that the molecules of the liquid crystal material in the voltageless state have a direction of orientation which is substantially parallel to the supporting plates or extends at a small angle with respect to the plane of the supporting plates.

3. A display device as claimed in claim 2, characterized in that the device comprises a polarizer and an analyzer, located in the desired paths of the incident and reflected beams, respectively, and in that the supporting plates have orientation layers giving the molecules of the liquid crystal a direction of orientation which is substantially parallel to the supporting plates or extends at a small angle with respect to the supporting plates and in that the direction of polarization of the polarizer extends at an angle to the direction of orientation of the molecules in the area of the first supporting plate.

4. A display device as claimed in claim 2, characterized in that the angle of the direction of orientation of the liquid crystal molecules with respect to the supporting plates is at most 15°.

5. A display device as claimed in claim 1, characterized in that the angle between the direction of polarization of the polarizer and the direction of orientation of the molecules at the area of the first supporting plate is substantially 45°.

6. A display device as claimed in claim 3, characterized in that the direction of orientation on the first supporting plate is twisted with respect to that on the second supporting plate.

7. A display device as claimed in claim 1, characterized in that the device is provided withh an extra layer of birefringent material such that this layer compensates a given quantity of birefringence in the liquid crystal layer.

8. A display device as claimed in claim 1, characterized in that a supporting plate is provided with spacers obtained by etching from a substantially uniform layer and in that the two supporting plates are held together by pressure means such that the layer of liquid crystalline material has a substantially uniform thickness.

9. A display device as claimed in claim 8, characterized in that the pressure means comprise silicon rubber.

10. A display as claimed in claim 1, characterized in that the device comprises a layer of reflective material between the picture elements and the layer of liquid crystal material.

11. A display device as claimed in claim 1, characterized in that the picture elements substantially completely cover the second supporting plate at the area of the liquid crystal material.

12. A display device as claimed in claim 1, characterized in that the supporting plate comprises one semiconductor substrate provided with drive circuits.

13. A display device as claimed in claim 11, characterized in that at least at the area of drive lines a layer of electrically conducting material is present between these lines and the picture electrodes, which layer is electrically insulated from the electrodes and said lines.

14. A display device as claimed in claim 11, characterized in that the device is provided with a layer of thermally conducting material on the side of the semiconductor material remote from the liquid crystal material.

15. A device for projection television, characterized in that it comprises at least one light source whose light is incident on a display device as claimed in any one of the preceding claims and is reflected dependent on the optical state of the picture elements, and in that the light thus modulated is imaged via projection means.

16. A display as claimed in claim 3, characterized in that the angle of the direction of orientation of the liquid crystal molecules with respect to the supporting plates is at most 15°.

17. A display device as claimed in claim 2, characterized in that the angle between the direction of polarization of the polarizer and the direction of orientation of the molecules at the area of the first supporting plate is substantially 45°.

18. A display device as claimed in claim 3, characterized in that the angle between the direction of polarization of the polarizer and the direction of orientation of the molecules at the area of the first supporting plate is substantially 45°.

19. A display device as claimed in claim 4, characterized in that the direction of orientation on the first supporting plate is twisted with respect to that on the second supporting plate.

20. A display device as claimed in claim 5, characterized in that the direction of orientation on the first supporting plate is twisted with respect to that on the second supporting plate.

21. A display device as claimed in claim 2, characterized in that the device is provided with an extra layer of birefringent material such that this layer compensates a given quantity of birefringence in the liquid crystal layer.

22. A display device as claimed in claim 3, characterized in that the device is provided with an extra layer of birefringent material such that this layer compensates a given quantity of birefringence in the liquid crystal layer.

23. A display device as claimed in claim 4, characterized in that the device is provided with an extra layer of birefringent material such that this layer compensates a given quantity of birefringence in the liquid crystal layer.

24. A display device as claimed in claim 5, characterized in that the device is provided with an extra layer of birefringent material such that this layer compensates a given quantity of birefringence in the liquid crystal layer.

25. A display device as claimed in claim 6, characterized in that the device is provided with an extra layer of birefringent material such that this layer compensates a given quantity of birefringence in the liquid crystal layer.

* * * * *